United States Patent
Thai

(10) Patent No.: US 9,111,072 B1
(45) Date of Patent: Aug. 18, 2015

(54) ANTI-REVERSE ENGINEERING UNIFIED PROCESS

(75) Inventor: Binh K. Thai, Centreville, VA (US)

(73) Assignee: Tectonic Labs, LLC, Falls Church, VA (US)

( * ) Notice: Subject to any disclaimer, the term of this patent is extended or adjusted under 35 U.S.C. 154(b) by 0 days.

(21) Appl. No.: 13/587,877

(22) Filed: Aug. 16, 2012

Related U.S. Application Data

(60) Provisional application No. 61/526,669, filed on Aug. 23, 2011.

(51) Int. Cl.
G06F 21/14 (2013.01)
G06F 21/50 (2013.01)
G06F 21/10 (2013.01)

(52) U.S. Cl.
CPC ............... *G06F 21/14* (2013.01); *G06F 21/10* (2013.01); *G06F 21/50* (2013.01)

(58) Field of Classification Search
None
See application file for complete search history.

(56) References Cited

U.S. PATENT DOCUMENTS

| | | | | |
|---|---|---|---|---|
| 7,188,241 B2 * | 3/2007 | Cronce et al. | ............ | 713/155 |
| 7,587,616 B2 * | 9/2009 | Jakubowski | ............ | 713/190 |
| 7,757,097 B2 * | 7/2010 | Atallah et al. | ............ | 713/187 |
| 7,841,009 B1 * | 11/2010 | Smith | ............ | 726/26 |
| 7,966,499 B2 | 6/2011 | Kandanchatha et al. | | |
| 8,023,651 B2 | 9/2011 | Gorissen et al. | | |
| 8,074,059 B2 * | 12/2011 | Mendes et al. | ............ | 712/227 |
| 8,108,689 B2 * | 1/2012 | Nicolson et al. | ............ | 713/190 |
| 8,176,473 B2 * | 5/2012 | Jacob et al. | ............ | 717/120 |
| 8,393,003 B2 * | 3/2013 | Eker et al. | ............ | 726/26 |
| 2003/0123665 A1 * | 7/2003 | Dunstan et al. | ............ | 380/255 |
| 2003/0221121 A1 * | 11/2003 | Chow et al. | ............ | 713/200 |
| 2006/0005251 A1 * | 1/2006 | Wu et al. | ............ | 726/26 |
| 2007/0234070 A1 * | 10/2007 | Horning et al. | ............ | 713/190 |
| 2009/0158051 A1 | 6/2009 | Michiels et al. | | |
| 2011/0135009 A1 * | 6/2011 | Sugita | ............ | 375/240.26 |

OTHER PUBLICATIONS

Air Force SBIR/STTR Transition Story, "Software Protection by Polymorphic and Metamorphic Transformations", p. 1-2.
"Trusted IP with Anti-Tamper", Atessa, http://www.atessainc.com/products/, p. 1, printed Aug. 16, 2012.
Asprotect Sofware, "What is ASProtect?", StarForce Technologies Ltd., http://www.aspack.com/asprotect.html, p. 1, printed Aug. 16, 2012.
Aakash Shah et al, Mechanisms to Provide Integrity in SCADA and PCS devices, Carnegie Mellon University, 2008.

* cited by examiner

*Primary Examiner* — Jung Kim
*Assistant Examiner* — Janusz Kusyk
(74) *Attorney, Agent, or Firm* — Gerald M. Donovan; Reed Smith LLP

(57) ABSTRACT

Computer-implemented systems, methods, and computer-readable media for generating and executing anti-reverse engineering software include receiving at least one of a set of input instructions and a set of input values; creating a deterministic environment; executing one or more functions corresponding to at least one of the set of input instructions and the set of input values while simultaneously generating a set of output values corresponding to the executed one or more functions, wherein the set of output values is generated based on a deterministic function of the computing device executing the one or more functions; and outputting the set of output values.

22 Claims, 4 Drawing Sheets

ANTI-REVERSE ENGINEERING UNIFIED PROCESS

PRIORITY CLAIM

This application claims the benefit of U.S. Provisional Application No. 61/526,669, filed Aug. 23, 2011; the disclosure of which is incorporated herein by reference.

BACKGROUND

Current software anti-reverse engineering techniques are often only marginally effective. Code obfuscation can only slow down the process of static analysis because the logic is still basically the same and exposed. Anti-debug and anti-disassembly techniques can only trick current versions of debuggers and disassemblers and can be disabled manually if attackers spot the tricking instructions. Code encryption must at some point leave the decrypted code in memory for execution, not to mention that the key used for decryption must be embedded somewhere in the program which can be revealed. Some protection schemes use many layers of protection but eventually have to leave the outermost layer unprotected and therefore attackers can cascade attacks from there.

Every lock on earth relies on the complexity of the key. But if the key is embedded inside the lock, its complexity becomes trivial. This is the common fundamental weakness of the techniques mentioned above, for they all can be put in one category: security through obscurity. That is, the key to unlock the protection mechanism is still embedded inside the software program and in theory can never escape complete logic analysis. Therefore, no matter how complicated the programmer writes the code, the complexity of the key only scales linearly with that of the whole protection scheme. With a combination of debugging and tracing tools, attackers can quickly analyze and find out the logic of the key in linear time.

This challenge does not exist in cryptography where the key is not present at all in the encrypted file and the searchable key space expands exponentially with the complexity of the protection mechanism. Unfortunately, cryptography cannot be applied directly for code protection since the processor only accepts assembly language which is publicly known and not encrypted. Thus, the key must be included for decryption should the code be encrypted.

Figure 1:
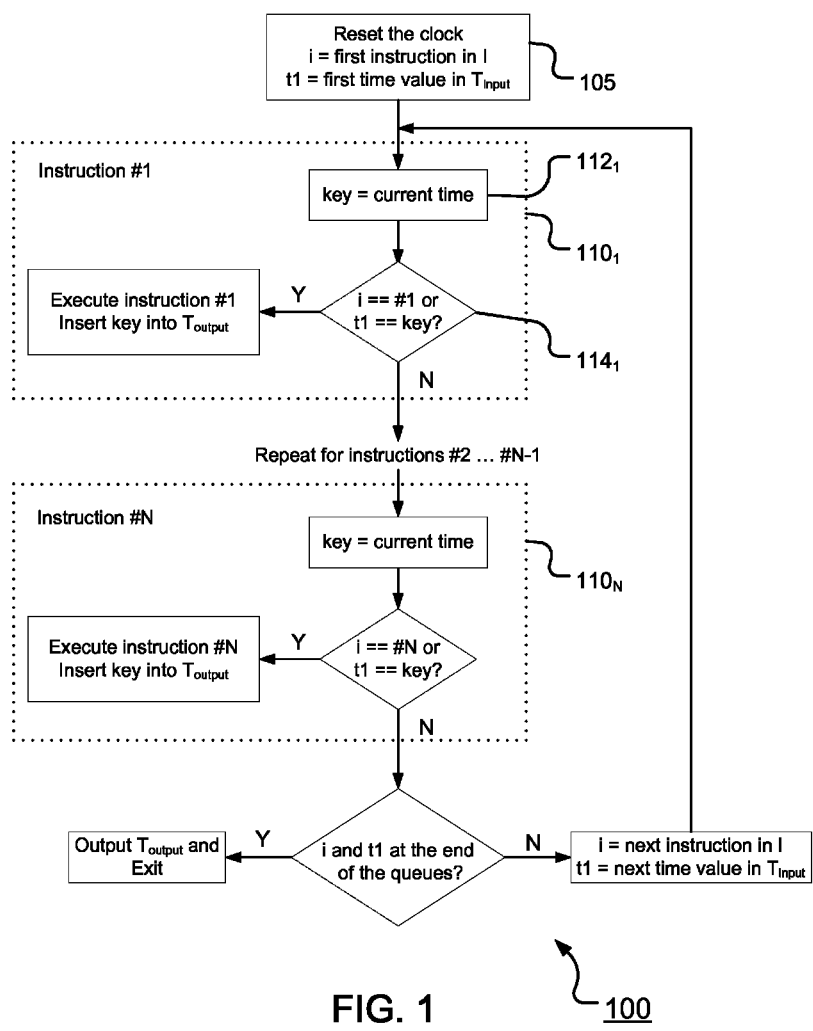
FIG. 1 shows an exemplary process flow configured to execute a set of instructions and output a timing map.

While systems and methods are described herein by way of example and embodiments, those skilled in the art recognize that systems and methods for anti-reverse engineering for software are not limited to the embodiments or drawings described. It should be understood that the drawings and description are not intended to be limited to the particular form disclosed. Rather, the intention is to cover all modifications, equivalents and alternatives falling within the spirit and scope of the disclosed embodiments. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

Disclosed embodiments provide computer-implemented methods, systems, and computer-readable media for anti-reverse engineering of software using a unified process. The unified process may allow a software programmer to execute a version of software in a setup mode that shows the programmer's logic while allowing other users to execute a version of the software in a run mode that prevents the users (i.e., potential attackers) from observing how the program works. Embodiments may provide a virtual machine executed on a computing device that can work but cannot be observed. Additionally, embodiments may preclude any backdoors that could allow any kind of observation into the virtual machine's working.

Embodiments may preclude static analysis by partly removing a portion of the logic of protected code out of an executable file and allowing the partly removed portion to be implied by the micro-architecture of a processor or computing device. Thus, in execution, the executable file and the designated processor may cooperate to execute the complete protected logic in such a fashion that any attempt at debugging the process will damage the process, thus preventing attackers from identifying the correct logic.

The following metaphoric scenario analogizes the problem of software anti-reverse engineering to removing protected logic out of an algorithm for traversing a maze and then explains how a transformed algorithm may become an "invisible" virtual machine. A robot may have millions or more possible paths to traverse a maze. A programmer may be tasked with writing instructions for the robot to go through the maze in an arbitrary path such that no one else can deduce the correct path from the instructions given the constraints that 1) everyone has the same knowledge regarding the robot's logic and 2) the language used to talk to the robot is a standard.

Suppose the maze has only three-way corners at which the robot can only go straight or make a turn. The programmer can write simple sequential instructions like "turn at A, straight at B, turn at C, etc." to guide the robot through a chosen path. However, this direction map is so straightforward that anyone can discover the path. Alternatively, the programmer might choose to encrypt the direction map. But no matter what kind of encryption is used, the programmer will have to give the robot the key for decryption, thus anyone can acquire the unprotected key.

The task sounds like a first dead end since whatever instructions the programmer writes down must conform to the known logic of the robot, and hence, according to the constraints, others can also understand it and discover the path. However, a method to solve this dead end may be to base the instructions on those factors usable by the robot but unusable and unobservable by anyone else, including the programmer. One such factor may be the robot's speed, assuming the robot has a deterministic but very complex speed function known to no one.

To exploit the robot's unknown speed, assume that the programmer can instruct the robot to follow the procedure below:
1. Reset the clock and enter the maze.
2. At every corner, compare the current value of its clock with a list of time values (e.g., 10 nanoseconds, 15 nanoseconds, 18 nanoseconds, etc.).
3. If a match occurs, make a turn at that corner. If not, go straight.
4. Repeat step 2 and 3 until getting out of the maze.

Since the speed of the robot is unknown, no one can deduce the distance it will travel in the time intervals above. Therefore, no one will know at which corners the robot will turn. Assuming that the programmer can create such a list of time values (i.e., a time map) in the procedure above, they have created instructions usable only by the robot.

However, the assumption in the above solution for the first dead end incurs a second dead end in which the programmer has to create time values based on the robot's speed which is unknown to all, including the programmer. However, the second dead end may be solved by letting the robot create the time values by itself. The process for creating the instructions may now have two modes. In the first mode, referred to as a setup mode, the programmer may give the robot the direction map to go through the maze and instruct it to record the time values corresponding to the corners at which it turns. By the time the robot completes the first run through the maze, it will have produced a time map containing the needed time values. Now the programmer can destroy the direction map and let the robot keep only the time map. From now on, every time the robot needs to run through the maze, it only needs to use the time map and follow this procedure. This mode may be referred to as a run mode.

Note that this metaphoric scenario assumes that the setup mode can be performed in a protected environment. In other words, a user or potential attacker cannot be present to look into the direction map the programmer gives the robot. Only after the programmer has finished the setup mode and destroyed the direction map can other users come and look into the time map kept by the robot. At this point, the time map may be visible to users. However, because users do not know the deterministic but complex speed function of the specific robot, they cannot derive the direction map from the time map.

The robot's speed function may be complex and dependent on many factors, including the activities of the robot while running (e.g., the robot's execution of the time map). The activities in the setup mode and the run mode mentioned above are different, thereby potentially causing the robot to have a different speed function in each mode. This means the time values created in the setup mode would become invalid in the run mode. This presents a third dead end requiring one time frame for two different processes. A programmer cannot simply add null activities to one mode to make it timing-equivalent to the other since the programmer does not know the robot's speed function with regard to its activities.

Embodiments may solve this problem by unifying the two processes into one unified process which carries all activities for both the setup mode and the run mode. This translates to the following procedure for the robot to do at each corner:
1. Read the direction map and make decision #1 for turning or not.
2. Read the time map and make decision #2 for turning or not.
3. If the current mode is the setup mode, make decision #1 the final decision. If the current mode is the run mode, make decision #2 the final decision.
4. If making a turn, write down the current time value into a new time map.
5. Follow the final decision to make a turn or not.

The procedure above may be applied to both the setup and the run mode. However, in the setup mode, the programmer may give the robot a direction map and a blank time map. After the setup mode, the robot will have created a time map because of step #4 in the unified process above and the programmer can destroy the original direction map. In the run mode, the programmer only needs to give the robot a blank direction map and the correct time map created in the setup mode. This solution completes the programmer's mission.

Embodiments provide a new software anti-reverse engineering technique that aims to solve the fundamental weakness in current techniques by applying the new concept presented above with the robot corresponding to the processor and the maps to the instructions for the processor. The act of the robot turning at a corner corresponds to the execution of a basic instruction in the processor. The time it takes for the robot to move corresponds to the time it takes for the processor to process instructions. In the robot scenario, the original logic of the direction map may be taken out in the time map and implied by the robot's speed. Similarly, embodiments may remove protected logic out of the executable file and let its logic be implied by the complex micro-architecture of a designated processor. That is, protected code may be transformed one-way into a time-based language which, in execution, will be interpreted by a virtual machine based on the precise performance of the particular processor in use. The transformed code therefore can be interpreted correctly only when run on the processor designated in the transformation process (i.e., in the setup mode). When run on a processor having a different performance (e.g., a different micro-architecture, a different clock rate, a different cache size, etc.), the virtual machine will interpret the time-based language differently (i.e., wrongly). Protected logic may thus be hidden by the complexity of the processor's micro-architecture.

The more complicated the designated processor is, the more secure the protected code may be. Modern processors are so complicated that their performance is considered deterministically chaotic as described in the Hugues Berry's 2005 paper "Chaos in Computer Performance", the contents of which are hereby incorporated by reference. Therefore, the transformed code may be incomprehensible to all, including the programmer, but the designated processor. Additionally, alternative embodiments may utilize the complexity of other aspects of a computing device (e.g., a system clock) to further increase security.

Since the virtual machine measures the precise performance of the processor (e.g., down to the exact number of clock cycles), its execution must be in a stable condition of the processor in which there are absolutely no interruptions. For this extreme sensitivity, any kind of interference, such as debugging, tracing, interrupts, emulation, tampering, and the like, may cause the transformed code to run incorrectly, thus preventing attackers from tracing the protected logic.

The unified process may be implemented in the form of a virtual machine. The virtual machine may be defined by the programmer to have an arbitrary set A consisting of N basic instructions (i.e., A={#1, #2, . . . , #N}) each of which may be specified to operate on a certain memory location within a defined memory pool M. Just like the robot takes both the direction map and the time map for its unified process, the virtual machine may accept two inputs:
1) A queue of indexes of basic instructions chosen out of A, which is equivalent to the direction map. Let each basic instruction be identified by a unique number from 1 to N.

An exemplary input queue may be I=[#3, #2, #6, #3] for the virtual machine to execute the corresponding sequence of instructions. Queue I may include an arbitrary number of basic instructions.

2) A queue of input time values, $T_{input}$, which is equivalent to the time map.

The outputs of this process will be the execution of the instructions in A corresponding to I and a queue of new time values, $T_{output}$. FIG. 1 shows an exemplary process flow 100 for this process. The process may be a loop which repetitively browses through all the basic instructions in A and executes any instruction as specified either in I or in $T_{input}$ while at the same time creating a new list of time values $T_{output}$.

This unified process may be used in the same fashion as described in the robot scenario. First, in a setup mode, a programmer may input an instruction queue I and an empty time value queue $T_{input}$. As the setup mode is performed, the virtual machine may execute the instructions in instruction queue I and may output a time queue $T_{output}$. For example, the virtual machine may receive as an input I=[#3, #2, #6, #3] and an empty $T_{input}$ as indicated in Table 1 below.

TABLE 1

| I | $T_{input}$ | $T_{output}$ |
|---|---|---|
| #3 | EMPTY | |
| #2 | EMPTY | |
| #6 | EMPTY | |
| #3 | EMPTY | |

While a computing device performs process flow 100, instructions in A are executed according to input I and the time at which each instruction in A is executed is inserted into the time queue $T_{output}$. For example, at step $110_1$ the process flow may set key to the current time at sub-step $112_1$ then at sub-step $114_1$ determine if either i==#1 or if t1==key (note that for clarity a single equal sign (=) is generally used in this disclosure as an assignment operator while a double equal sign (==) is generally used in this disclosure as an equality operator). Because $T_{input}$ was empty, t1 cannot equal key, so in the setup mode step $114_1$ may reduce to determining whether i==#1. Because the first instruction i in I is #3, the determination may result in "N" (i.e., no or Boolean 0) and proceed to the next step $110_2$ (not shown). Eventually, at step $110_3$ a match may be found where i==#3, thus instruction #3 may be executed and the current time (i.e., key) may be inserted into the $T_{output}$ queue. This process may continue to loop until the end of one or more of instruction queue I and $T_{input}$ queue is reached. Table 2 below shows an exemplary $T_{output}$ queue that may be generated by a computing device executing instruction queue I according to process flow 100.

TABLE 2

| I | $T_{input}$ | $T_{output}$ |
|---|---|---|
| #3 | EMPTY | 2 ns |
| #2 | EMPTY | 3 ns |
| #6 | EMPTY | 5 ns |
| #3 | EMPTY | 6 ns |

As explained above, the $T_{output}$ queue may be unique to the specific micro-architecture of the processor or computing device executing the instructions. Because of the level of sophistication of the processor, the $T_{output}$ queue may only be generated by the specific micro-architecture of the processor executing the instructions and may not be derived by even the programmer who may know the instruction queue I. After the setup mode is complete, the programmer may destroy the instruction queue I and keep only the newly created time queue $T_{output}$ as a time map $T_{map}$. From then on, in a run mode the virtual machine may execute the same instruction sequence again by inputting only the $T_{map}$ as the $T_{input}$ and an empty instruction queue I. Table 3 below illustrates such an input.

TABLE 3

| I | $T_{input}$ | $T_{output}$ |
|---|---|---|
| EMPTY | 2 ns | |
| EMPTY | 3 ns | |
| EMPTY | 5 ns | |
| EMPTY | 6 ns | |

The process flow 100 may then be performed by a computing device to execute the same instructions illustrated above in table 1. The specific micro-architecture of the processor may provide unique timing to provide the logic hidden by the timing map. As process flow 100 is performed, the instructions may be executed as set forth by the programmer and a new $T_{output}$ queue may be filled with the same timing map data determined when the instructions I were executed. Table 4 below illustrates the queue $T_{output}$ after being filled by process flow 100 being performed with $T_{map}$ as the $T_{input}$. Notice that even though the specific micro-architecture of the processor may be extremely complex, the process flow 100 executed within a deterministic virtual machine may execute the process in the same time (e.g., the same number of processor cycles may be utilized to perform the same steps of process flow 100 every time it is executed) independent of whether the process flow 100 is being utilized in a setup mode or a run mode.

TABLE 4

| I | $T_{input}$ | $T_{output}$ |
|---|---|---|
| EMPTY | 2 ns | 2 ns |
| EMPTY | 3 ns | 3 ns |
| EMPTY | 5 ns | 5 ns |
| EMPTY | 6 ns | 6 ns |

While the above generally discloses receiving an empty instruction queue I or an empty $T_{input}$, embodiments may be configured to automatically generate an empty time value queue $T_{input}$ upon receipt of an instruction queue I or to automatically generate an empty instruction queue I upon receipt of a time value queue $T_{input}$.

Figure 2:
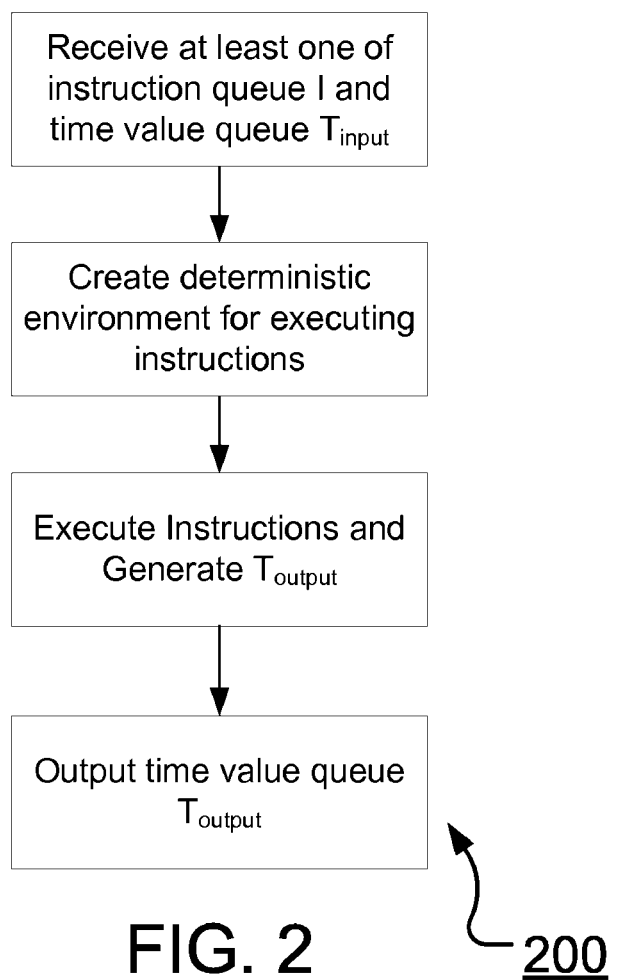
FIG. 2 shows an exemplary process flow of FIG. 1, including a step of creating a deterministic environment for performing one or more steps.

Process flow 100 illustrates a unified process flow that performs the same functions independent of whether the virtual machine is running in a setup mode or in a run mode. In other words, the terms setup mode and run mode refer to how a programmer or user utilizes the process and does not change how the process is performed. FIG. 2 shows a simplified exemplary process flow 200 performing the same functionality as process flow 100 described above. FIG. 2 illustrates that a virtual machine according to embodiments disclosed herein may receive at least one of an instruction queue I and a time value queue $T_{input}$, create a deterministic environment for the virtual machine so that a consistent timing map may be generated, execute the instructions according to the received input while simultaneously generating a timing map, and output a timing map $T_{output}$. If the received instruction queue I corresponds to the original instructions prepared by a programmer, then the virtual machine may correctly execute the instructions and generate a unique timing map $T_{output}$ corresponding to the micro-architecture of the processor on which the virtual machine is being executed.

Alternatively, if a previously generated correct time value queue $T_{output}$ is received as input, the virtual machine may also correctly execute the instructions and generate the same unique time value queue corresponding to the micro-architecture of the processor. However, if there have been any changes to the system (e.g., if an attacker attempts to observe the operation of the virtual machine such as by inserting break points, if the attacker attempts to derive the operation of the virtual machine by inputting a modified instruction queue I or time value queue $T_{input}$, if an attacker attempts to execute the time value queue on a processor having a different micro-architecture, and the like), the incorrect instructions will execute and an incorrect time value queue $T_{output}$ will be output by process flow 200.

Embodiments assume that the internal working mechanism of the processor is sufficiently complex that no one can deduce the meanings (i.e., the corresponding basic instructions) of various values of key unless trying all possible values for the instruction queue in the setup mode. Therefore, an executable file with the protected code executing in the run mode will not contain the "key" of the protection scheme.

As noted above, for the virtual machine to run correctly and stably, it must be executed free of any nondeterministic time-variant factors during execution (i.e., the performance of the virtual machine must be deterministic). For example, the virtual machine may run in a special mode of the processor in which all the interrupts are disabled. Otherwise, asynchronous interrupts caused by various hardware parts of the system may cause the time frame of the unified process to vary and the time values created in the setup mode will likely become invalid in the run mode.

Also, all variant latencies may be eliminated for the unified process to be stable. For example, all necessary data from the external memory to be transferred to the cache of the processor may be locked to hide the variant latencies often associated with accessing the external memory.

Every time the unified process runs, regardless whether in the setup mode or run mode, it might process different data. Embodiments may be configured such that the execution time of related operations may be independent of the parameters. For example, if the execution time of a multiply instruction is dependent on the operands, the multiply instruction may be replaced by an algorithm consisting of only logic operations which have constant execution time. Prior to execution of an instruction set I, embodiments may be configured to detect operations having potentially inconsistent execution time and replace them with alternative operations (e.g., logical operations) having consistent execution time.

Embodiments may alternatively require a programmer to provide a set of instructions I having a consistent execution time. Embodiments may determine whether a set of instructions has a consistent execution time, for example by executing the set of instructions multiple times and comparing the execution time, and alert a programmer if the instructions have an inconsistent execution time.

While the exemplary embodiment of FIG. 1 may have a linear key space, alternative embodiments may have an exponential key space. The following provides a brief explanation of linear and exponential key spaces then proceeds to disclose embodiments having exponential key spaces.

Suppose a black-box contains a hidden string S1 having n letters. The box may allow a user to input a string of letters S2 and compare strings S1 and S2. If S1 contains S2 from the first letter (e.g., "abcde" vs. "abc" or "abcde" vs. "abcde"), the black-box may output "yes". Otherwise, the black-box may output "no". In such a black-box, the string S1 may be determined by searching each letter separately. A user may search for the first letter, such as by searching each letter in turn (e.g., "a", "b", . . . , "z") until receiving a "yes". Once determining the first letter, the user may search for the second letter (e.g., if the first letter is "a", search "aa", "ab", . . . , "az"). The user may repeat the same steps to find the rest of the n letters. In this scenario, the maximum number of trials therefore would be 26*n as the alphabet has 26 letters. Thus, the searchable key space expands only linearly with n and is typically referred to as linear space. This kind of key space is small and can be cracked quickly (e.g., via a brute force attack).

Similar to this example of S1, attackers may somewhat efficiently attack the virtual machine and process flow described with reference to FIG. 1 above by executing the process in the setup mode and searching for the meanings of each time value separately. To find the first instruction, the attacker can try specifying an instruction from set A as the first instruction in an instruction queue and input this queue to the virtual machine to get the corresponding time value. The attacker can then repeat this trial for each of the instructions from A and eventually will find an instruction that has a time value equal to the first time value in the original time queue ($T_{map}$). Therefore, in the unified process described above the key space expands linearly with the complexity of the process. More specifically, the size of the key space is equal to the size of A multiplied by the length of the instruction sequence to be executed. This key space may be too small to meet some security requirements.

To increase the security, the black-box described with reference to S1 may be given a much larger key space by applying the following rules. If the length of S2 is less than that of S1, the black-box may append as many default letters (e.g., "z") as needed to S2 to make it have the same length as S1. For example, if S1 is "abcdef" and S2 is "abc", the black-box may change S2 to "abczzz". Thus, in operation, when the black-box compares S1 to the modified S2, it will give out a "yes" only if the two entire strings are identical and a "no" otherwise. With such a modified behavior of the black box, an attacker cannot search for each letter separately. Instead, the attacker would have to input strings containing n letters and will receive a "yes" only when the attacker inputs the correct string. The key space, therefore, increases to $26^n$, a considerably large key space that expands exponentially with n. This type of key space may be referred to as an exponential key space.

In similar fashion to the exponential key space of the black-box, embodiments may provide a unified process having a key space that expands exponentially with N, the number of instructions in set A. To accomplish this, a virtual machine according to embodiments may hide individual time values into a composite time value. In an exemplary embodiment, this may be accomplished by multiplying individual time values together in the setup mode. The resulting composite value may then be the input for the run mode in which the virtual machine will check if a particular value (i.e., key) is a component of the composite value by dividing the composite value by key and compare the remainder to zero. In other embodiments, alternative functions may be useful for incorporating individual time values into one or more composite time values.

The virtual machine may also create a default time value. The default time value may be incorporated into the composite value for every invalid and/or null instruction specified in the instruction queue. For example, the default time value may be incorporated into the composite value based on a probability basis.

Figure 3:
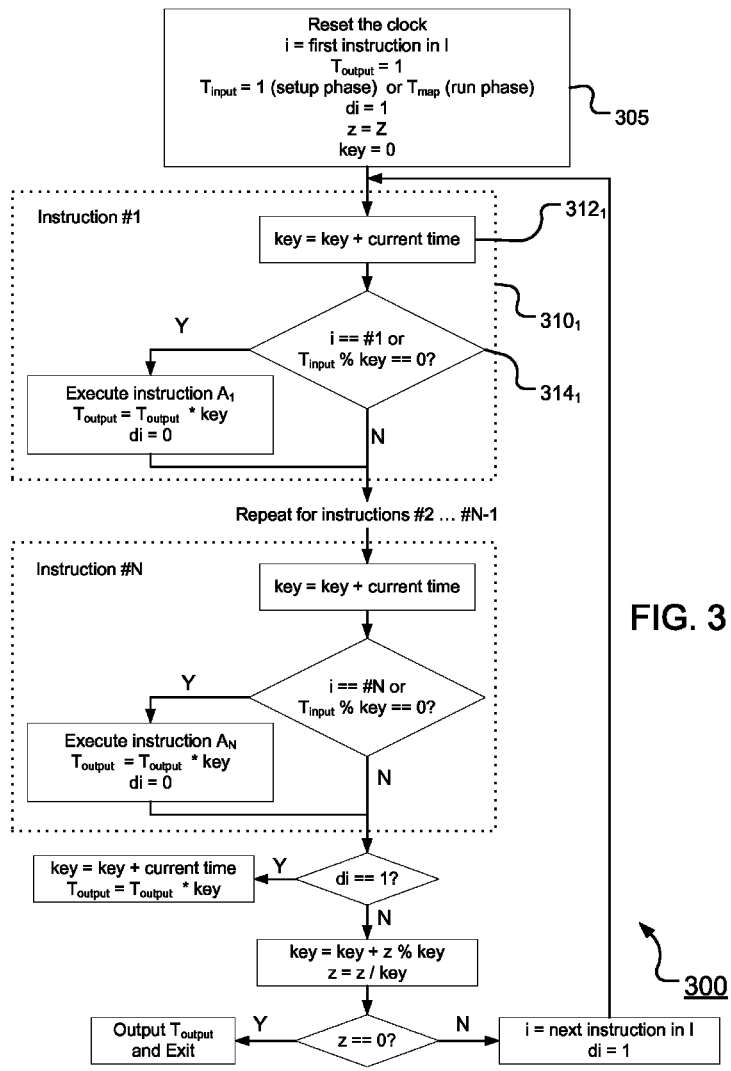
FIG. 3 shows an exemplary process flow for a virtual machine configured to generate a composite time output value.

To ensure that the virtual machine cannot be terminated prematurely and will incorporate the same number of time values (either valid or default values) into the composite time value, the virtual machine may be configured to receive a large value Z (as shown in FIG. 3 discussed below). Z may be reduced over time and the virtual machine may be configured to terminate only when it reaches zero. Alternatively, the virtual machine may be configured to terminate when Z reaches a different threshold value. To prevent an attacker from inputting a small value Z to terminate the virtual machine early, the virtual machine may be configured to incorporate Z into the composite time value.

FIG. 3 shows an exemplary process flow 300 for a virtual machine configured to generate a composite time value $T_{output}$. The virtual machine may receive as an input one or more of an instruction map I, an input composite time value $T_{input}$ (in a setup mode $T_{input}$ may equal "1" while in a run mode $T_{input}$ may equal $T_{map}$, a previous composite $T_{output}$), and a large value Z. Process flow 300 may also initialize composite time value $T_{output}$ to 1, a Boolean variable "di" to "0", and key to "0". The variable di is a Boolean variable for checking if an instruction has been executed in the current iteration of the loop.

In a setup mode, process flow 300 may receive an input of $T_{input}=1$ so that $T_{input}$% key (i.e., the remainder of the integer division $T_{input}$/key) will never equal 0. This configures the process to only execute the instructions in the instruction map I during a setup mode. The setup mode may thus both execute the instructions in instruction map I and generate an output composite time value $T_{output}$. $T_{output}$ may then be used as a timing map, $T_{map}$, a valid composite time value representing the sequence of instructions previously described by instruction map I. In a run mode, $T_{input}$ may receive the $T_{map}$ composite value and an empty I to execute the same set of instructions.

To determine a value for Z, in the setup mode a programmer may test multiple input values until determining a Z value that is big enough for the virtual machine to complete the instruction queue I but not so big that lots of computing cycles are wasted. The statement "z=z/key" illustrates that at the end of each cycle of process flow 300, the virtual machine may reassign z the integer division of z by key. The statement "key=key+z % key" incorporates z into key so that attackers cannot change the value of Z at the beginning to terminate the loop prematurely. If a different value Z is received as input, it may cause deviations in the values of key and hence the correct logic path may not be executed.

If attackers try to search for the first instruction in the original I by in turn assigning every basic instruction as the first instruction in an instruction queue and inputting the queue to the process for the setup mode, they will get a new $T_{output}$ different from the original $T_{output}$ even though they might have specified the first instruction correctly. This is because after the unified process executes the first and only instruction in the queue, in the next iteration variable i will become an invalid number and a default time value will be incorporated into the new $T_{output}$ and the process will continue on until z==0. The final new $T_{output}$ will be composed of the time value of the first instruction and several default time values. This works similarly for all partial instruction queues.

In other words, attackers will not be able to find individual instructions separately. Instead, they will have to specify the complete instruction queue of n instructions to find the whole sequence of instructions at one time and try all possible combinations until they find a $T_{output}$ that is exactly equal to a known $T_{input}$. Therefore, the size of the key space of a virtual machine performing process flow 300 is $N^n$ where N is the size of the basic instruction set A. This key space will expand exponentially with the complexity of the virtual machine and the length of the original instruction queue I.

Attackers may attempt to run a virtual machine performing process 300 in a hybrid of a run mode and a setup mode by inputting the known valid $T_{input}$ and, at the same time, inputting an instruction queue I having only one instruction. If the one instruction is a correct one, the virtual machine will produce $T_{output}=T_{input}$ in the run mode. The attacker now can go on searching for the next instruction in the queue. This weakness can be fixed by making sure the code of the two modes cannot be effective at the same time. This may be achieved by replacing the decision sub-steps of process flow 300 relating to each instruction (e.g., decision $314_1$) to perform an exclusive or ("XOR") function rather an or function. For example, sub-step $314_1$ may determine whether "i==#1 XOR $T_{input}$% key==0". Because attackers may modify the code of the virtual machine to change the code back to using an OR operator, the code of a virtual machine may employ a "code-check" mechanism to prevent such changes. The code-check may randomly and dynamically read code around the program counter and incorporate it into the time values. Thus, if the code of the virtual machine is modified, such as if an attacker replaced an XOR with an OR, the virtual machine may fail to correctly execute the instructions and may generate an inoperative $T_{output}$ even when the virtual machine receives a valid $T_{input}$ value.

Additionally, the exemplary process flow 300 may apparently anonymously execute a wrong instruction in the run mode in instances where the key happens to be evenly divisible by $T_{input}$. Alternative embodiments may be modified or settings of embodiments may be varied to avoid such an occurrence. In still other embodiments, a composite time value determined according to an alternative function may avoid the false positive of an anomalous key being evenly divisible by $T_{input}$.

Process flows 100, 200, and 300 illustrate exemplary embodiments of unified processes for anti-reverse engineering of software code. Of course, the various steps illustrated in the process flows may be altered or rearranged in alternative embodiments. For example, in an alternative embodiment similar to process flow 300, the step "key=key+z % key" may be performed at the beginning of each loop of the process flow rather than at the end of each loop. Likewise, while process flow 300 illustrates an embodiment that decreases a large value Z as a function of a current time value, in alternative embodiments the value may be altered as a function of a value other than time. Further, alternative embodiments may receive a small value as an input. In such embodiments, the small value may be increased rather than decreased and the unified process may terminate when the small value exceeds a certain threshold. Of course, other embodiments may receive other inputs useful for determining a number of iterations of the unified process. Further, embodiments may include additional or fewer steps.

In the process described above, "current time" may be incorporated into key as an addition for simplicity. In fact, it may be a non-linear incorporation. For example, its bits can be shuffled and mixed with the value of "current time". Any method may be implemented to make key a deterministic but very complex function of time. Further, embodiments may use a value other than, or in addition to, time. For example, embodiments may be configured to employ a function of a set of any values collected from the system (e.g., values based on software or hardware).

The above embodiment is discussed in relation to a process flow having the composite time value depend on the real time clock. In general, however, embodiments can incorporate a lot more factors into the composite time value, making a time map even more complicated and, hence, more secure. There are two main types of factors: logical factors (e.g. number of clock cycles, number of cache fetches/misses, etc.) and physical factors (e.g. an external real time clock). For logical factors, in general, a system clock cycle is the smallest variation since all signals are synced with one clock source. Therefore, processors of the same micro-architecture may run the protected code correctly regardless of variations in fractions of a clock cycle that may be caused by temperature, power, imperfect oscillators, and the like. On the other hand, the nonlinear incorporation of these logical factors into the time values can cause huge deviations even for a single clock cycle difference. Therefore, unless a processor has the exact same micro-architecture as the one used in the transformation, an input time map, $T_{map}$, will not run correctly. For example, on the Xscale 270 microprocessor, even turning on or off the debugging registers changes the performance counters.

For example, some embodiments may incorporate the values of a program counter into the output values (e.g., by calling a function that returns values in the stack frame). In such embodiments, if an attacker attempted to "unroll" the loop of the unified process flow 300 to place breakpoints on the inner iterations of the loop, the breakpoints would unavoidable change the set of values of the program counter seen by the virtual machine because the virtual machine code would then execute in different places (i.e., not the limited space bounded by the original loop). If the attacker were to modify the code in the function to return fake values, this would also require a different processor instruction than the original one and therefore change the timing.

For physical factors, the time map may be sensitive to variations of fractions of a clock cycle even for the same processor micro-architecture. Thus embodiments may incorporate physical factors into a time map to lock an instruction set to a single processor to further increase security. Such embodiments, however, may sacrifice the ability to deploy across multiple processors having the same micro-architecture.

Embodiments may also be configured to modify the setup code of the virtual machine to be junk code before publicly distributing the virtual machine in a run mode. The junk code may be a modified version that may execute in the same time frame as unmodified setup code. Thus, embodiments may hide the two-face architecture of the virtual machine.

The foundation for the security provided by various embodiments is based on the complexity of the hardware micro-architecture of the designated processor. To defeat these embodiments, attackers may have to have the capability to simulate the internal working of the designated processor with the precision of up to one clock cycle. This is impossible because modern processors are considered too complicated to be simulated exactly. Further, even when the exact simulation is possible, only the manufacturer of the particular processor can do so since the data and information needed for the simulation are kept as trade secrets.

Because the security of virtual machines according to the embodiments disclosed are based on a processor's complexity which is supposed to be unknown to all, including the virtual machine's creator, the transformation process's mechanism may be made public just like a cryptography algorithm. Software developers can perform the transformation on their own and keep the untransformed code (i.e., the instruction map) secret for themselves and hence the security will not be dependent on anyone else, including the virtual machine creator.

The code transformation performed by the embodiment of process flow 300 is non-linear in the sense that the composite time value $T_{output}$ may change completely and non-linearly if any instruction in the protected original sequence of instructions is changed or the code of the virtual machine is changed. These non-linear changes make it extremely difficult for attackers to do analysis of $T_{map}$ to gain insight into the run-mode process.

Attackers may also attempt to use hardware breakpoints to stop the processor at instructions which are to be executed as indicated in $T_{input}$ in order to trace the protected code. However, embodiments may preclude such an attack by using no branch when deciding whether to execute an instruction or not. For example, if an instruction in I is to reset a variable x to zero, it may be coded in C language as follows:

```
key = key + current time
tl = T_input % key
// check if tl != 0, assuming that tl is 32 bits
tl |= tl >> 16    // logic-OR tl[31.. 16] with tl[15.. 0]
tl |= tl >> 8     // logic-OR tl[15.. 8] with tl[7.. 0]
tl |= tl >> 4     // logic-OR tl[8..4] with tl[3.. 0]
tl |= tl >> 2     // logic-OR tl[3..2] with tl[1..0]
tl |= tl >> 1     // logic-OR tl[1] with tl[0]
tl &= 1           // take only the least significant bit
x = tl * x        // if tl == 0, then i = 0; if tl == 1, i is unchanged
```

With the above pseudo code, all instructions may always be executed but their effect may depend on whether key is divided evenly by $T_{input}$ or not. Therefore, if attackers place a breakpoint on any instruction of the virtual machine, the processor may be interrupted right in the first iteration of the loop, thus giving attackers no information into the protected code sequence.

Attackers may also attempt to place breakpoints on accesses to memory locations to stop the processor in the middle of the run mode to gain insight into the process. The virtual machine may be configured to prevent this kind of attack by accessing all data after the clock is reset and before the main loop is executed. Therefore, all data breakpoints, if any, may stop the processor right at the beginning of the run mode, giving attackers no insight into the process.

Attackers might try to use external timers to issue interrupts to the processor during the run-mode process. However, embodiments may use a technique similar to the one discussed in the section above to guarantee that the global interrupt flag is disabled during the run-mode process.

Attackers might try to modify the code of the virtual machine to record data of the run-mode process in order to trace the sequence of instructions implied by a $T_{map}$. Embodiments may preclude such an attack since it will change the timing of the run mode and cause embodiments to execute a wrong sequence of instructions. To add more security, the transformation process can randomly read code around the processor's program pointer and incorporate it into $T_{output}$ to guard against code tampering.

Embodiments may also have another security layer that turns off all debugging facilities of the processor during the run-mode process. The transformation process may be executed when all debugging facilities are turned off and the value of the hardware registers that control the debug facilities may be incorporated into the time values. If attackers turn on the debugging facilities in the run mode, that may cause the time values to have incorrect values and thus will damage the process and prevent attackers from tracing the correct logic. Attackers may try to tamper with the code that reads the debug control registers into key to give fake values but such an attack may be precluded because of the virtual machine's inherent anti-tamper capability (as discussed above) together with the code-check mechanism.

Attackers might try to execute the virtual machine on top of a general-purpose virtual machine which can record a trace of the unified process. Embodiments may cause such an attack to fail too since it causes an effect similar to the case of tampering.

If attackers gain the knowledge of the transformation process, they might try to transform all possible sequences of instructions to find a $T_{output}$ that matches the $T_{input}$ in the executable file and therefore find the corresponding instruction set I (i.e., they may attempt a brute-force attack). However, embodiments preclude such an attack since the total number of trials is $N^n$ where N is the number of basic instructions and n is the number of instructions in the original sequence. This can be made a huge number that may take attackers many years. The numbers N and n can be arbitrarily changed when a virtual machine is designed but the speed of the virtual machine may be affected.

Attackers might try to use hardware debuggers to capture output signals from the processor during the execution of the virtual machine. This method may guarantee no interference to the execution of the virtual machine. However, since the processor will execute the virtual machine from its internal cache, listening to the external signals will not provide significant information into the process.

In light of these various security measures, embodiments may only be attacked via a brute-force attack which may take many years.

Alternative embodiments may provide anti-reverse engineering processes without having a unified setup mode and run mode. Such embodiments may execute instructions in a deterministic virtual machine according to a series of time values or according to a composite time value independent of the process of creating the time values. However, such embodiments may provide a backdoor into the run mode that embodiments having a unified run mode and setup mode may avoid.

Figure 4:
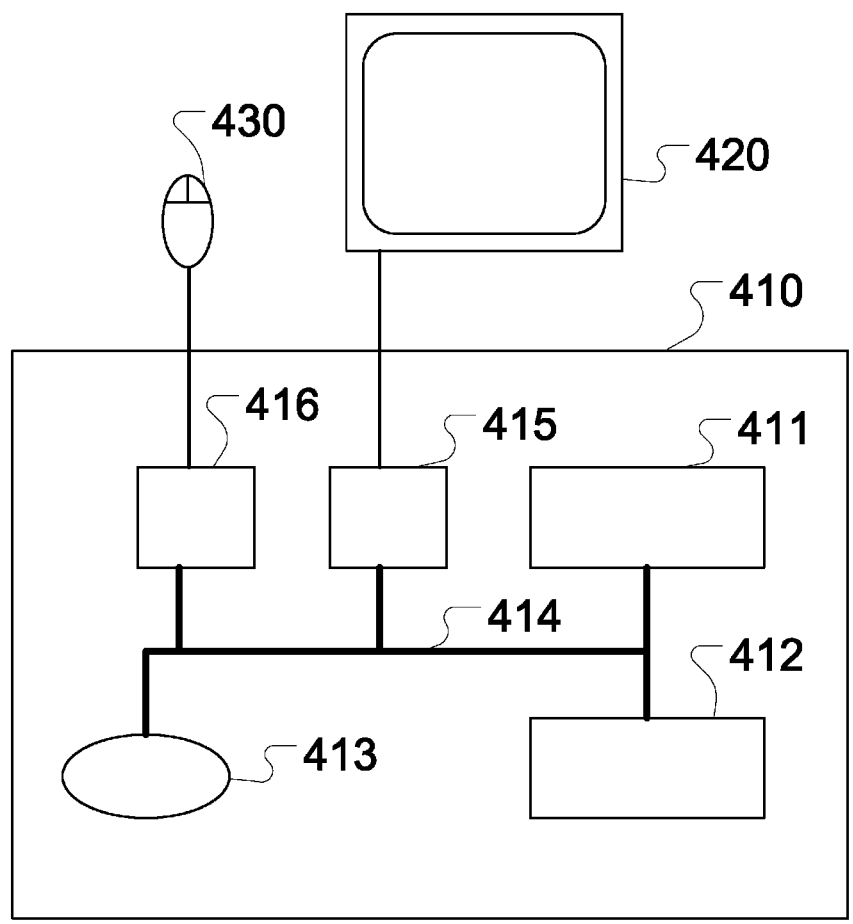
FIG. 4 shows an exemplary computing device useful for performing processes disclosed herein.

These embodiments may be implemented with software, for example modules executed on computing devices such as computing device 410 of FIG. 4. Computing device 410 has one or more processing device 411 designed to process instructions, for example computer readable instructions (i.e., code) stored on a storage device 413. By processing instructions, processing device 411 may perform the steps and functions disclosed herein. Storage device 413 may be any type of storage device (e.g., an optical storage device, a magnetic storage device, a solid state storage device, etc.), for example a non-transitory storage device. Alternatively, instructions may be stored in one or more remote storage devices, for example storage devices accessed over a network or the internet. Computing device 410 additionally may have memory 412, an input controller 416, and an output controller 415. A bus 414 may operatively couple components of computing device 410, including processor 411, memory 412, storage device 413, input controller 416, output controller 415, and any other devices (e.g., network controllers, sound controllers, etc.). Output controller 415 may be operatively coupled (e.g., via a wired or wireless connection) to a display device 420 (e.g., a monitor, television, mobile device screen, touch-display, etc.) in such a fashion that output controller 415 can transform the display on display device 420 (e.g., in response to modules executed). Input controller 416 may be operatively coupled (e.g., via a wired or wireless connection) to input device 430 (e.g., mouse, keyboard, touch-pad, scroll-ball, touch-display, etc.) in such a fashion that input can be received from a user.

Of course, FIG. 4 illustrates computing device 410, display device 420, and input device 430 as separate devices for ease of identification only. Computing device 410, display device 420, and input device 430 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 410 may be one or more servers, for example a farm of networked servers, a clustered server environment, or a cloud network of computing devices.

Embodiments have been disclosed herein. However, various modifications can be made without departing from the scope of the embodiments as defined by the appended claims and legal equivalents.

The invention claimed is:

1. A method for generating and executing anti-reverse engineering logic comprising:
   receiving, by a computing device, at least two sets of input values, wherein at least one of the at least two sets of input values is a non-empty set;
   executing, by the computing device, one or more functions corresponding to both a combination of the at least two sets of input values and a set of states of the computing device, wherein the one or more functions correspond to a logic to be protected;
   generating, by the computing device, a set of output values corresponding to both the executed one or more functions and the set of states of the computing device; and
   outputting, by the computing device, the set of output values,
   whereby when the set of output values is later used as one of the at least two sets of input values, the method executes the same one or more functions, and
   whereby an alteration of the set of states of the computing device results in the method executing one or more different functions.

2. The method of claim 1,
   wherein the step of executing, by the computing device, one or more functions corresponding to both the combination of the at least two sets of input values and the set of states of the computing device comprises:
   using a first value in a first set of input values to make a first determination of whether a function is to be executed;
   using a first value in a second set of input values and the set of states to make a second determination of whether the function is to be executed; and
   executing the function if either the first determination or the second determination is true.

3. The method of claim 1, wherein the step of executing, by the computing device, one or more functions corresponding to the at least one set both the combination of the at least two sets of input values and the set of states of the computing device comprises:
   iterating through each function in a non-empty set of functions, for each function performing the method:
   identifying a key value corresponding to set of states of the computing device;
   identifying whether the function is to be executed based on a function of the key value and the at least two sets of input values; and executing the function and inserting the key value into the set of output values if the function is to be executed.

4. The method of claim 1, further comprising creating, by the computing device, a deterministic environment,
wherein said executing one or more functions corresponding to both the combination of the at least two sets of input values and the set of states of the computing device and said generating the set of output values corresponding to both the executed one or more functions and the set of states of the computing device are performed within the deterministic environment.

5. The method of claim 4, wherein the step of creating, by the computing device, the deterministic environment comprises disabling interrupts.

6. The method of claim 1, wherein the step of executing, by the computing device, one or more functions corresponding to the combination of the at least two sets of input values, and the step of generating, by the computing device, the set of output values corresponding to both the executed one or more functions and the set of states of the computing device are executed in a loop structure, and
wherein a termination condition of the loop structure is based on a value that is changed by a deterministic function of the computing device until it meets a certain condition.

7. The method of claim 1, wherein the set of output values are incorporated into an output composite value.

8. The method of claim 7, wherein a non-operational value is additionally generated and incorporated into the output composite value,
wherein when the output composite value is later used as an element of the at least two sets of input values, the non-operational value does not alter execution of the same one or more functions.

9. The method of claim 1, further comprising replacing, by the computing device, one or more branching functions with one or more non-branching functions that render equivalent results.

10. A system for generating and executing anti-reverse engineering logic comprising:
a memory; and
a processor operatively coupled to the memory, the processor configured to perform the method comprising:
receiving at least two sets of input values, wherein at least one of the at least two sets of input values is a non-empty set;
executing one or more functions corresponding to both a combination of the at least two sets of input values and a set of states of the computing device, wherein the one or more function correspond to a logic to be protected;
generating a set of output values corresponding to both the executed one or more functions and the set of states of the computing device; and
outputting the set of output values,
whereby when the set of output values is later used as one of the at least two sets of input values, the processor executes the same one or more functions, and
whereby an alteration of the set of states of the computing device results in the method executing one or more different functions.

11. The system of claim 10,
wherein the step of executing one or more functions corresponding to both the combination of the at least two sets of input values and the set of states of the computing device comprises:
using a first value in a first set of input values to make a first determination of whether a function is to be executed;
using a first value in a second set of input values and the set of states to make a second determination of whether the function is to be executed; and
executing the function if either the first determination or the second determination is true.

12. The system of claim 10, wherein the step of executing one or more functions corresponding to both the combination of the at least two sets of input values and the set of states of the computing device comprises:
iterating through each function in a non-empty set of functions, for each function performing the method:
identifying a key value corresponding to the set of states of the computing device;
identifying whether the function is to be executed based on a function of the key value and the at least two sets of input values; and
executing the function and inserting the key value into the set of output time values if the function is to be executed.

13. The system of claim 10, wherein the processor is further configured to perform the method of creating a deterministic environment,
wherein said executing one or more functions corresponding to both the combination of the at least two sets of input values and the set of states of the computing device and said generating the set of output values corresponding to both the executed one or more functions and the set of states of the computing device are performed within the deterministic environment.

14. The system of claim 13, wherein the step of creating the deterministic environment comprises disabling interrupts.

15. The system of claim 10, wherein the step of executing one or more functions corresponding to the combination of the at least two sets of input values, and the step of generating the set of output values corresponding to both the executed one or more functions and the set of states of the computing device are executed in a loop structure, and
wherein a termination condition of the loop structure is based on a value that is changed by a deterministic function of the computing device until it meets a certain condition.

16. The system of claim 10, wherein the set of output values are incorporated into an output composite value.

17. The system of claim 16, wherein a non-operational value is additionally generated and incorporated into the output composite value,
wherein when the output composite value is later used as an element of the at least two sets of input values, the non-operational value does not alter execution of the same one or more functions.

18. The system of claim 10, wherein the processor is further configured to perform the method of replacing one or more branching functions with one or more non-branching functions that render equivalent results.

19. A non-transitory computer-readable medium having computer-readable code stored thereon that, when executed, performs the method:
receiving at least two sets of input values, wherein at least one of the at least two sets of input values is a non-empty set;
executing one or more functions corresponding to both a combination of the at least two sets of input values and a set of states of the computing device, wherein the one or more functions correspond to a logic to be protected;

generating a set of output values corresponding to both the executed one or more functions and the set of states of the computing device; and outputting the set of output values, whereby when the set of output values is later used as one of the at least two sets of input values, the method executes the same one or more functions, and whereby an alteration of the set of states of the computing device results in the method executing one or more different functions.

20. The medium of claim 19, wherein the step of executing one or more functions corresponding to both the combination of the at least two sets of input values and the set of states of the computing device comprises:

using a first value in a first set of input values to make a first determination of whether a function is to be executed;

using a first value in a second set of input values and the set of states to make a second determination of whether the function is to be executed; and executing the function if either the first determination or the second determination is true.

21. The medium of claim 20, wherein the step of executing one or more functions corresponding to both the combination of the at least two sets of input values and the set of states of the computing device comprises:

iterating through each function in a non-empty set of functions, for each function performing the method:

identifying a key value corresponding to the set of states of the computing device;

identifying whether the function is to be executed based on a function of the key value and the at least two sets of input values; and executing the function and inserting the key value into the set of output values if the function is to be executed.

22. The medium of claim 19, wherein the set of output values are incorporated into an output composite value.

* * * * *